United States Patent Office
3,293,289
Patented Dec. 20, 1966

3,293,289
SYNTHESIZING CARBOXY-TERMINATED
POLYMERS
George B. Butler, Gainesville, Fla., and Henry C. Allen,
Decatur, Ala., assignors to the United States of America as represented by the Secretary of the Army
No Drawing. Filed Sept. 18, 1962, Ser. No. 224,570
24 Claims. (Cl. 260—533)

The invention described herein may be manufactured and used by or for the Government for governmental purposes without the payment of any royalty thereon.

This inventioin relates generally to a method for synthesizing carboxy-terminated polymers and more specifically to synthesizing low molecular weight polymers from ethylenically unsaturated monomers, said polymers having reactive carboxy-terminal groups.

Hydrocarbon elastomers are highly desirable as binders for solid rocket propellants because of their excellent fuel value. Such binders were first achieved through the use of a liquid copolymer of butadiene and acrylic acid. This copolymer was cured to an elastomer by the reaction of the randomly distributed carboxy groups with difunctional epoxy compounds. Although this copolymer had an average functionality of two, any single chain might have from zero to five or six functional groups due to the random nature of the copolymer. The lack of uniformity resulted in substantial variations in the physical properties of the binders. These variations were reflected in the properties of propellant compositions which employed these binders. It was evident that more uniformity could be obtained with a polymer in which the chain contained a carboxy group at each terminal position. This increase in uniformity would result in a corresponding increase in uniformity in the propellant composition. The problem, therefore, was to devise a simple process for preparing a carboxy terminated polymer.

The reaction of cyclohexanone peroxide with aqueous ferrous sulfate solution has been described by Cooper and Davidson [J. Chem. Soc., 1180, (1952)] as producing mainly hexanoic and dodecanediodic acids. Kharasch and Nudenburg [J. Org. Chem. 19, 1921, (1954)] proposed the following reaction in which the 1-hydroxy-cyclohexoxy radical is formed in the reaction with the salt, followed by a rearrangement to a radical of hexanoic acid:

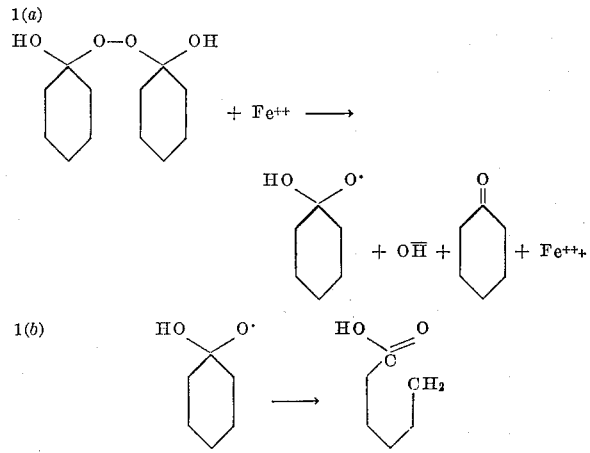

On the basis of this knowledge, it was undertaken to devise a method of initiating and terminating polymerization reactions for synthesizing carboxy terminated polymers having a viscosity suitable for further processing, for example, a molecular weight of 3000 to 5000.

In accordance with the foregoing it is an object of this invention to synthesize low molecular weight polymers having reactive terminal carboxy groups through which such polymers may be reacted to obtain higher molecular weight materials.

Another object of the present invention is to synthesize polymers having reactive carboxy terminal groups which can be cured to rubbers at moderate temperatures.

Yet another object of the instant invention is the synthesis of liquid polymers and copolymers having reactive carboxy terminal groups.

A further object of the invention is to synthesize polymers having reactive carboxy terminal groups which can be cast or molded in the liquid state at room temperature, then cured to the final product without the use of high curing temperatures, for example, at 150° F. or lower.

Generally, these and other objects of the invention are accomplished through a process whereby a peroxide of a cyclic ketone, in the presence of excess reducing agent, cleaves to form a free radical of an alkanoic acid, the carboxy group being on the non-growing end. The free radical initiates polymerization of appropriate ethylenically unsaturated monomeric substances. This polymerization continues until planned termination by reaction with another free radical. Therefore, a polymer of the desired molecular weight is formed with a carboxy group on each of the terminal positions.

The achievement of such a process presented many difficulties. The basic problem was to provide alkanoic acid radicals in the presence of sufficient monomers to sustain the reaction. It was expected that the molecular weight of the polymers could be readily controlled by regulating the rate of introduction of alkanoic acid radical. The probability of radical combination to form a difunctional polymer would also be increased.

Preliminary investigations of the reaction were made using cyclohexanone peroxide, ferrous sulfate, and butadiene. Emulsion technique was selected as the best method for utilizing aqueous ferrous sulfate and butadiene in polymerization reactions of this type [Golding, Polymers and Resins, D. Van Nostrand Co., Inc., Princeton, N.J. (1959), chapters 5 and 9]. The emulsions had the general formulation presented in Table I below.

Table 1

| | |
|---|---|
| Distilled water | 750 ml. |
| Triton X–102 [1] | 19 gms. |
| Benzene | 50 ml. |
| Butadiene | 108 gms. (2.0 moles). |
| $FeSO_4 \cdot 7H_2O$ | 0.15 mole. |
| Cyclohexanone peroxide | .10 mole (20:1 molar ratio of butadiene to peroxide). |

[1] Polyoxyethylated octyl phenol, Rohm & Haas Co.

In the initial runs, the components of the reaction mixture other than the ferrous sulfate were emulsified in glassware at 0° C. In these runs benzene served as a solvent for the cyclohexanone peroxide and to retard the evaporation of the butadiene (B.P. —4.4° C.) so that the runs could be made at atmospheric pressure. The ferrous sulfate was added slowly to the emulsion in the form of an aqueous solution. Low yields of waxy polymer having very low carboxy content were obtained, indicating a slow reaction between ferrous sulfate in the aqueous phase and cyclohexanone peroxide in the oil phase. Similar runs using one-tenth the amount of ferrous sulfate added over the same period of time, produced as much polymer of approxmiately the same molecular weight, but with virtually no carboxy content as shown by infrared spectra and titration with sodium methylate.

Since the amount of iron caused little effect on molecular weight and yield, and as carboxy groups were substantially absent in the polymers, it was speculated that a chain-transfer reaction was the dominant factor over molecular weight, and that relatively few hexanoic acid radicals were being produced across the liquid interface of the emulsion. Consideration of all the materials led to the conclusion that cyclohexanone peroxide was the most effective chain-transfer agent present. To avoid the chain-transfer reaction required that the cyclohexanone peroxide be reduced by the ferrous salt before reaching the polymerizing monomer. The runs were modified to the extent that cyclohexanone peroxide in benzene solution was added dropwise to the emulsion in which the ferrous sulfate was dissolved in the aqueous phase. An improvement in yield and molecular weight control resulted, and carboxy content increased sufficiently to account for half of the terminal positions which viscosity measurement indicated were present. But with benzene, a water immiscible solvent, interfacial reaction with the ferrous ions was still slow allowing much of the cyclohexanone peroxide to reach the polymerization site before transformation into hexanoic acid free radicals.

To facilitate the reduction of the peroxide by the ferrous ions, the cyclohexanone peroxide was dissolved in a water-miscible solvent. The water-miscible solvent eliminated the liquid interface between the ferrous ions and the peroxide. Specifically, the one-tenth mole of cyclohexanone peroxide was dissolved in 65 milliliters of tetrahydrofuran and added at a uniform dropwise rate to an emulsion of the materials set forth in Table I exclusive of the cyclohexanone peroxide listed therein. This variation in the process produced much improved yields, good molecular weight control, and sufficient carboxy content to account for end groups. These results essentially proved the chain-transfer activity of unreduced cyclohexanone peroxide and demonstrated that the rate of ion-peroxide reaction across the liquid interface was relatively slow.

From these results, it is seen that in the latter procedure the hexanoic acid radicals are generated in the aqueous phase of the emulsion. To initiate polymerization, these radicals must be extracted into the butadiene-benzene mixture before they are destroyed by some other reaction. The rate of extraction being dependent upon the surface area of the oil phase, a good emulsion is essential in moving enough radicals across the liquid interface to prevent long chain build-up before radical combination occurs, if molecular weight control is to be achieved. Because of this, in a purposely poor emulsification, the molecular weight could not be limited to the desired low range. Furthermore, an unduly high percentage of initiator was wasted since those radicals not extracted by the organic phase rapidly combine to form dodecanedioic acid. In good emulsification, fifty percent of the acid generated is found in the polymer when the rate of peroxide addition is adjusted to limit the molecular weight to about 3,300.

Emulsions were prepared using the materials of Table I in the amounts specified, excepting the cyclohexanone peroxide. The cyclohexanone peroxide was dissolved in 65 mls. of tetrahydrofuran and added at a uniform, dropwise rate over a three-hour period. The temperature of the emulsion was maintained at 0° C. due to the low boiling point of butadiene, until completion of the polymerization reaction. At the end of the three hours, the reaction mixture was acidified with hydrochloric acid to a pH of approximately 3.0 to insure complete conversion of all carboxy groups to the free acid. The mixture was then extracted with chloroform. The chloroform solution was diluted with excess methanol to precipitate the polymer. After decanting, the polymer was again taken up in chloroform which was subsequently removed under vacuum.

The finished polymer was a clear, viscous liquid. In benzene, the infrared spectrum of the polymer shows a strong absorption at 1,710 cm.$^{-1}$, which is characteristic in long chain acids. The remainder of the spectrum is typical of radical-initiated polybutadiene. Further proof of near difunctionality was obtained by reacting the polymer with a polyfunctional imine. The reaction product was an elastomer such as would result only from multiple chain extensions and chain branching of the liquid polymer.

The results of four runs using the same procedure as outlined above are contained in Table II below.

*Table II*

| Run No. | [η] | —COOH equiv./100 gm. | Mol. Wt. from —COOH content |
|---|---|---|---|
| 1 | 0.135 | 0.060 | 3,300 |
| 2 | 0.134 | 0.059 | 3,350 |
| 3 | 0.130 | 0.059 | 3,350 |
| 4 | 0.137 | 0.059 | 3,350 |

The uniformity in these results are exemplary of the reproducible results which can be achieved in polymers prepared by the process of the invention.

To demonstrate the preparation of copolymers through the process of the invention, additional runs were made using the same materials and in the same amounts as set forth in Table I with the exception that 0.15 mole of butadiene was replaced with 0.15 mole of isoprene. The technique employed in the preparation of the polymers of Table II was repeated. The copolymer produced was also a viscous liquid and demonstrated the same properties of carboxy-termination as mentioned above. In this same manner, a carboxy-terminated copolymer of butadiene and styrene or acrylonitrile can be prepared by replacing a portion of the butadiene monomer with styrene and acrylonitrile.

Lithium dextrose added to the emulsion in small amounts was found to facilitate the polymerization reaction although it is in no way an essential component.

From the above discussion and examples, it is apparent that the molecular weight of the polymer can be regulated by either of two features of the process. Increasing the amount of the emulsifying agent lowers the average molecular weight of the polymers produced if other conditions and aspects remain constant. This is due to the increase in the surface area of the oil phase since there are more droplets of oil dispersed in the emulsion. The larger interface surface area affords the alkanoic acid radical a greater chance of being extracted from the aqueous phase into the oil phase where it can terminate the polymeric chain. Molecular weight is also dependent upon the rate at which the peroxide of the cyclic ketone is added to the emulsion. Decreasing the rate of addition increases the average molecular weight of the polymer since fewer acid radicals become available to terminate the polymerization reaction. Therefore, the present process is not limited exclusively to the synthesis of low molecular weight poylmers but can be utilized in the preparation of polymers of high molecular weight simply by regulating the amount of emulsifying agent and the rate of addition of the peroxide of the cyclic ketone.

The specific embodiments of the invention are for the purpose of exemplication only. Due to the nature of free-radical initiated polymerization of ethylenically unsaturated monomers which undergo addition polymerization, it is apparent to those skilled in the art that the process of the invention is useful in the polymerization of other similar materials normally polymerized by a free-radical. The process is broadly applicable to the polymerization of ethylenically unsaturated ($>$C=C$<$) monomers possessing the characteristic vinyl group, $CH_2$=CH—, vinylene group, —CH=CH— or vinylidene group, $CH_2$=C=.

The ethylenically unsaturated monomers which undergo free-radical initiated polymerization reactions are well known in the art. The compounds listed hereinafter are illustrative of the type of monomers which can be polymerized according to the process of the invention to produce carboxy-terminated polymers.

(a) Dienes such as chloroprene, butadiene-1,3, hexadiene-2,4, and isoprene.

(b) Alkanoic acid esters of allyl alcohol as exemplified by allyl acetate and allyl butyrate.

(c) Allyl halides as, for example, allyl chloride and allyl bromide.

(d) Allyl ethers such as ethyl allyl ether and diallyl ether.

(e) Alkenoic acids, their esters, and salts typified by acrylic acid, methacrylic acid, methyl acrylate, butyl methacrylate, and ethylacrylate.

(f) Vinyl compounds exemplified by vinyl chloride, vinylidene chloride, vinyl acetate, and vinyl butyrate.

(g) Styrene and similar aromatic hydrocarbons having the characteristic ethylenically unsaturated substituents.

Moreover, by using a combination of any two of the above listed monomers or similar monomers, the present process readily adapts to the preparation of carboxyterminated copolymers. In the preparation of the copolymers, acetonitrile may be employed as a comonomer.

The preferred embodiments of the invention is in the synthesis of carboxy-terminated polymers of the conjugated dienes such as butadiene-1,3, isoprene, hexadiene-2,4, and chloroprene as well as carboxy-terminated copolymers of these dienes with each other and with other ethylenically unsaturated monomers which normally take place in addition polymerization reactions. Examples of these ethylenically unsaturated monomers which can be employed as comonomers with the dienes are those previously identified hereinabove as being suitable for polymerization by the process of the invention.

Particularly useful reducing agents for the process are the water-soluble inorganic ferrous and cobaltous salts. For reasons of economy, ferrous salts, particularly ferrous sulfates will usually be employed. An excess of the reducing agent is always employed, the molar ratio of reducing agent to peroxide usually being from 1.1:1.0 to 2.0:1.0 although a greater excess is not detrimental. There is little, if any, advantage in the use of over one molar excess of the reducing agent.

Cyclic ketones whose peroxides may successfully be employed in the novel process of the invention include the five-, six-, and seven-membered ring systems; that is, cyclopentanone, cyclohexanone, and cycloheptanone. Cyclopentanone peroxide reacts slowly, however. The readily accessible peroxide of cyclohexanone is the preferred member of the group.

Triton X–102 is the preferred emulsifying agent though it is apparent that other emulsifier can be employed. Likewise, in the recovery step, acidification may be accomplished with any non-oxidizing inorganic acid such as sulfuric and hydrohalic acids. Hydrochloric acid is well suited for this purpose. The pH of the reaction mixture is not limited to 3.0 but may vary in the range of 2.0 to 4.5.

In the examples, benzene is employed solely to retard the evaporation of butadiene so that the reaction may be carried out without superatmospheric pressure. With other high boiling vinyl monomers, the benzene can be omitted. Similarly, the tetrahydrofuran merely serves as a solvent of the cyclohexanone peroxide. Any inert, water-miscible solvent for the peroxide of the cyclic ketones could be used in lieu thereof. The chloroform employed in the polymer extraction can be replaced with other solvents for the polymer. Removal of the chloroform solvent under vacuum is a routine expedient and not a limitation in the recovery process.

As in most chemical reactions the temperature employed is determined by the nature of the reactants and the particular result desired. The temperature and pressure should be regulated so as to minimize loss of reactants and to maintain a liquid medium. The low boiling point of butadiene requires a low operating temperature or superatmospheric pressure. The process can be conducted at elevated temperature and pressure and it is sometimes desirable to do so. Following the general procedure employed in the runs tabulated in Table II, polymers were prepared at a temperature of 50° C. and a pressure of 78 p.s.i.g. The polymers resulting from this modification contained approximately sixty percent of the trans-1,4-addition product whereas the same reactants at 0° C. and atmospheric pressure had contained 75 percent of the trans-1,4-addition product. In these runs the technique was modified to the extent that the cyclohexanone peroxide solution was continuously added at a uniform rate through a tube inserted beneath the surface of the emulsion. Such temperature and pressure modifications for the control of cis and trans isomerization are within the skill of the art, being similar to modifications normally employed in the preparation of addition reaction type polymers.

The use of distilled water is not a critical limitation but its utilization assists in the achievement of uniformity. Water treated by ion-exchange means is also acceptable in the process.

In the laboratory scale preparations discussed hereinabove, it was satisfactory to introduce the cyclic ketone peroxide solution through dropwise addition. This method of addition obviously creates small areas within the emulsion where polymerization is actually being initiated and terminated. However, in large scale preparations or even in small scale laboratory preparations where suitable means of uniform agitation are available, the peroxide solution can be continuously added to the emulsion. Thus, the process of the invention is in no way limited to the dropwise addition techniques of the illustrative examples. Furthermore, the transformation of the laboratory process to a large scale operation would be a routine chemical engineering expedient since the process obviously lends itself to large scale batch or continuous operations.

The following example is illustrative of the type of binder which has been prepared from the polymers produced by the process of this invention. To 4.999 gms. of the liquid polymer identified in Table II having dissolved therein 1% by weight phenylbetanapthylamine, there was added with mixing 0.150 gm. of methyl-aziridinyl-phosphine oxide. The mixture was cured for 120 hours at 63° C. The product was a strong, soft, elastic polymer. By incorporating the reactants in a propellant composition before curing, a binder was achieved. The phenylbetanapthylamine is used to deter surface oxidation of the cured product.

While the usefulness of the process has been exemplified with the preparation of material for propellant binders, it will find wide application in the polymer art in the preparation of coating materials, etc.

The present process is subject to many variations and no undue limitations should be deduced from the foregoing detailed description. Hence, the invention should not be considered as limited to the specific embodiment set forth above but only as defined in the appended claims.

We claim:

1. The process of synthesizing carboxy-terminated liquid polymers from ethylenically unsaturated monomers which undergo addition polymerization, said process comprising the steps of:

(a) emulsifying thoroughly a mixture comprising water, reducing agent, emulsifier, and ethylenically unsaturated monomer selected from the group consisting of butadiene-1,3, isoprene, hexadiene-2,4, chloroprene, and mixtures thereof, while maintaining the temperature and pressure at levels which minimize vaporization loss of said unsaturated monomer, wherein said reducing agent is a member selected from the group consisting of inorganic water-soluble ferrous and cobaltous salts;

(b) adding to the emulsion mixture defined in step (a) with mixing and at a uniform rate a water-miscible solution of peroxide of a saturated cyclic ketone having 5 to 7 carbon atoms in the carbocyclic ring and of such a quantity that the reducing agent is always in excess of the stoichiometric quantity required to reduce the peroxide, the peroxide thereby undergoing reduction by the reducing agent as the peroxide solution is added and thereafter rearrangement to yield the corresponding alkanoic acid free radicals which initiate and terminate the polymerization reaction with the monomers, the rate of adding the peroxide solution being such that polymerization is terminated within a predetermined molecular weight range, and the molar ratio of said ethylenically unsaturated monomer to said cyclic ketone peroxide being such as to yield enough alkanoic free acid radicals from the latter to terminate the polymerization of said ethylenically unsaturated monomer at an average molecular weight of about 3000–5000;

(c) acidifying the resulting reaction mixture to a pH of 2.0 to 4.5 with an inorganic, non-oxidizing mineral acid;

(d) recovering the produced polymer of a molecular weight range of 3,000 and 5,000.

2. The process according to claim 1 wherein butadiene and isoprene are the comonomers.

3. The process according to claim 2 wherein the isoprene and butadiene are dissolved in benzene before emulsifying, and the reactants are maintained at approximately 0° C. and atmospheric pressure throughout emulsification and polymerization.

4. The process according to claim 1 wherein the polymer is recovered from the acidified reaction mixture by extraction into an inert organic solvent with subsequent removal of the solvent.

5. The process according to claim 4 wherein the solvent is chloroform.

6. The process according to claim 1 wherein the emulsifying agent is polyoxyethylated octyl phenol.

7. The process according to claim 1 wherein the peroxide is cyclohexanone peroxide.

8. The process according to claim 1 wherein the peroxide is dissolved in tetrahydrofuran.

9. The process according to claim 1 wherein the reaction is conducted at elevated temperatures and pressure.

10. The process according to claim 1 wherein the molar ratio of reducing agent to peroxide is 1.1:1 to 2.0:1.

11. The process according to claim 1 wherein a small amount of lithium dextrose is added to the emulsion before adding the peroxide solution.

12. The process according to claim 1 wherein the reducing agent is ferrous sulfate.

13. The process according to claim 1 wherein the acidification is accomplished with hydrochloric acid.

14. The process according to claim 1 wherein the unsaturated monomer to be polymerized is butadiene dissolved in benzene.

15. The process according to claim 14 wherein the emulsifier is polyoxyethylated octyl phenol and the emulsion temperature is maintained at approximately 0° C. at atmospheric pressure throughout emulsification and polymerization.

16. The process according to claim 1 wherein a portion of said monomer is replaced by at least one compound selected from the group consisting of styrene and acrylonitrile.

17. The process for synthesizing carboxy-terminated liquid polymers of butadiene, said process comprising the steps of:

(a) emulsifying thoroughly a mixture comprising water, ferrous sulfate, emulsification agent, and butadiene while maintaining the reaction temperature and pressure so as to reduce the loss of butadiene through vaporization;

(b) adding slowly to the emulsion mixture defined in step (a), peroxide of cyclohexanone dissolved in a water-miscible solvent and of such an amount that the ferrous sulfate is always in excess of the stoichiometric quantity necessary to reduce the peroxide, the peroxide thereby undergoing reduction by the ferrous sulfate as the peroxide is added and thereafter rearrangement to yield the free radical of hexanoic acid which initiates and terminates the polymerization with the butadiene to form carboxy-terminated polybutadiene, the rate of adding the peroxide being such that polymerization is terminated within a molecular weight range of 3,000–5,000 and the molar ratio of said butadiene to said peroxide being about 20:1;

(c) acidifying the resulting reaction mixture with a non-oxidizing inorganic acid to a pH of approximately 3.0 thereby insuring the conversion of the carboxy groups to the free carboxy groups;

(d) recovery of the polymer from the reaction mixture.

18. The process according to claim 17 wherein the recovery consists of extraction into chloroform followed by the addition of excess methanol to precipitate the polymer; separation of the precipitate; redissolving the precipitate in chloroform; and finally, removing the chloroform under vacuum.

19. The process according to claim 18 wherein a portion of the butadiene is replaced by a portion of a compound selected from the group consisting of isoprene, styrene, and acrylonitrile.

20. The process according to claim 17 wherein the butadiene is dissolved in benzene before emulsifying.

21. The process according to claim 20 wherein the temperature is maintained at 0° C. and the pressure is atmospheric throughout emulsification and cyclohexanone peroxide addition.

22. The process according to claim 21 wherein the emulsification agent is polyoxyethylated octyl phenol and the solvent for the cyclohexanone peroxide is tetrahydrofuran.

23. The process according to claim 17 wherein the emulsification agent is polyoxyethylated octyl phenol and the solvent for the cyclohexanone peroxide is tetrahydrofuran.

24. The process according to claim 17 wherein the polymerization reaction is conducted at elevated temperature and superatmospheric pressure.

References Cited by the Examiner

UNITED STATES PATENTS

| 2,811,551 | 10/1957 | Drake et al. | 260—533 |
| 2,870,200 | 1/1959 | Kharasch et al. | 260—533 |
| 3,083,191 | 3/1963 | Uraneck et al. | 260—94.7 |

FOREIGN PATENTS 317,482  1/1957  Switzerland.

OTHER REFERENCES

Bovey et al.: Emulsion Polymerization, Interscience, N.Y., 1955, pp. 357–358.

Palit et al.: Journal Poly. Sci. 50 (1961), pages 45–52.

JOSEPH L. SCHOFER, *Primary Examiner.*

E. I. SMITH, *Assistant Examiner.*